United States Patent [19]
Ishizuka et al.

[11] Patent Number: 5,282,050
[45] Date of Patent: Jan. 25, 1994

[54] DUAL-SIDE RECORDING APPARATUS

[75] Inventors: Haruo Ishizuka, Tokyo; Yuji Seki, Kawasaki, both of Japan

[73] Assignee: Canon Kabushiki Kaisha, Tokyo, Japan

[21] Appl. No.: 816,533

[22] Filed: Dec. 30, 1991

Related U.S. Application Data

[63] Continuation of Ser. No. 429,058, Oct. 30, 1989, abandoned.

[30] Foreign Application Priority Data

| Oct. 31, 1988 | [JP] | Japan | 63-275532 |
| Jan. 23, 1989 | [JP] | Japan | 1-013460 |
| Jan. 23, 1989 | [JP] | Japan | 1-013461 |
| Jan. 23, 1989 | [JP] | Japan | 1-013462 |
| Jan. 31, 1989 | [JP] | Japan | 1-020990 |
| Jan. 31, 1989 | [JP] | Japan | 1-020991 |

[51] Int. Cl.$^5$ .............................................. H04N 1/00
[52] U.S. Cl. ....................................... 358/400; 358/405; 358/476
[58] Field of Search .............. 358/405, 407, 408, 474, 358/476, 480, 481, 486, 487, 488, 491, 493, 494, 496, 497, 498, 296, 400, 434, 435, 436; 355/23, 24, 25, 26

[56] References Cited

U.S. PATENT DOCUMENTS

| 4,125,325 | 11/1978 | Batchelor et al. | 355/26 |
| 4,300,169 | 11/1981 | Sato | 358/401 |
| 4,641,954 | 2/1987 | Miyata et al. | 355/23 |
| 4,806,979 | 2/1989 | Tokoro et al. | 355/24 |
| 4,839,740 | 6/1989 | Yoshida | 358/486 |
| 4,849,821 | 7/1989 | Allen et al. | 358/405 |
| 4,853,740 | 8/1989 | Ushio et al. | 355/24 |
| 4,876,604 | 8/1989 | Nobuta | 358/400 |
| 4,897,331 | 1/1990 | Negi et al. | 370/29 |
| 4,903,139 | 2/1990 | Minter | 358/296 |

FOREIGN PATENT DOCUMENTS

| 0104561 | 6/1983 | Japan | H04N 1/00 |
| 0061767 | 4/1985 | Japan | 355/23 |
| 6231866 | 8/1985 | Japan | 355/319 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image recording apparatus includes a receipt unit for receiving image data, a recorder unit for recording the image data received by the receipt unit, the recorder unit being able to be operated in a dual-side mode for recording image data on both sides of a recording medium and in a single-side mode for recording image data on a single side of the recording medium, and a selector for selecting one of the dual-side mode and the single-side mode.

17 Claims, 21 Drawing Sheets

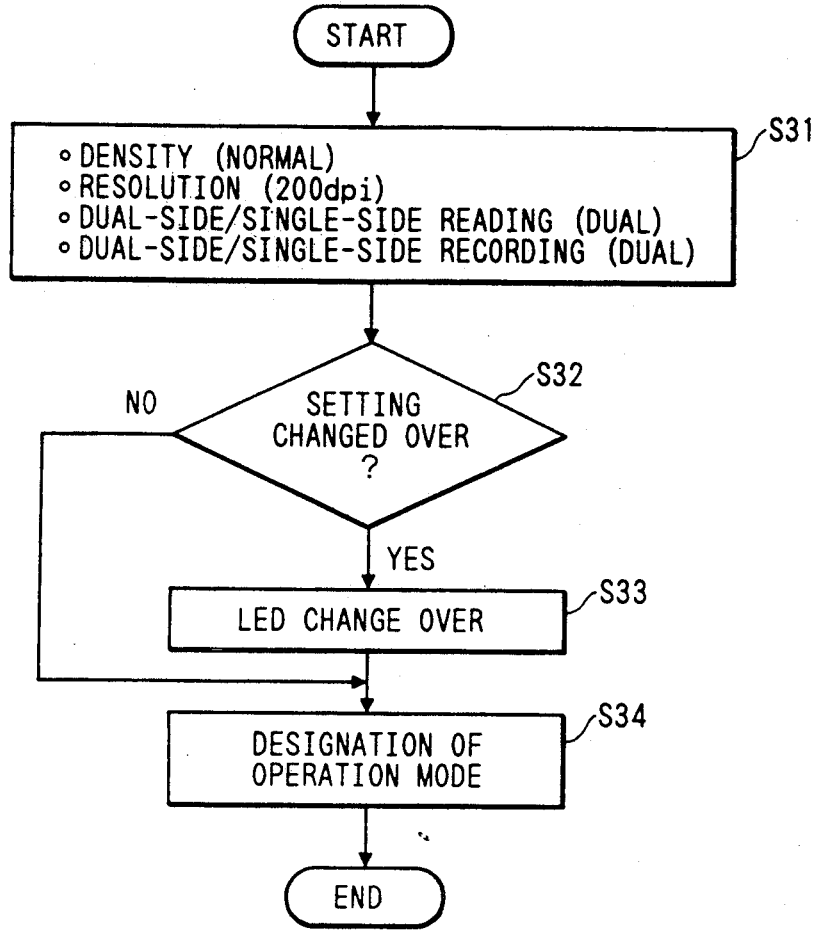
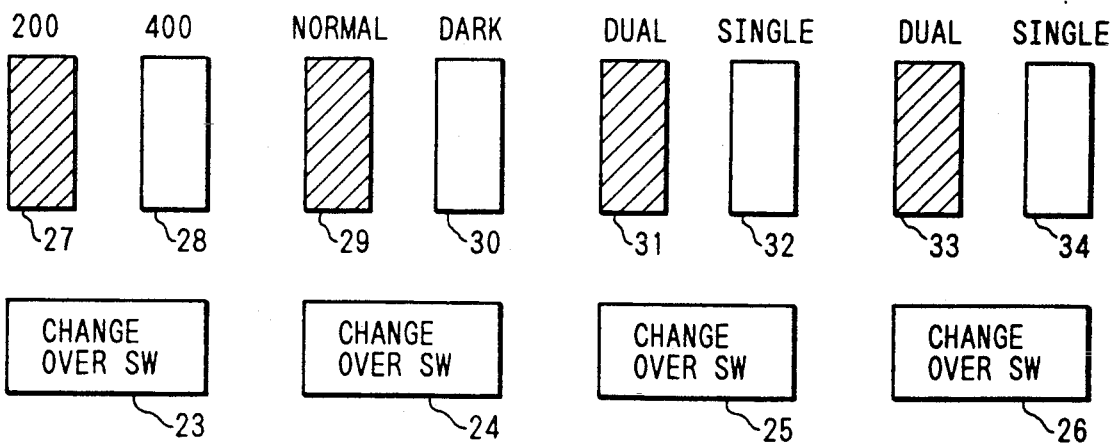

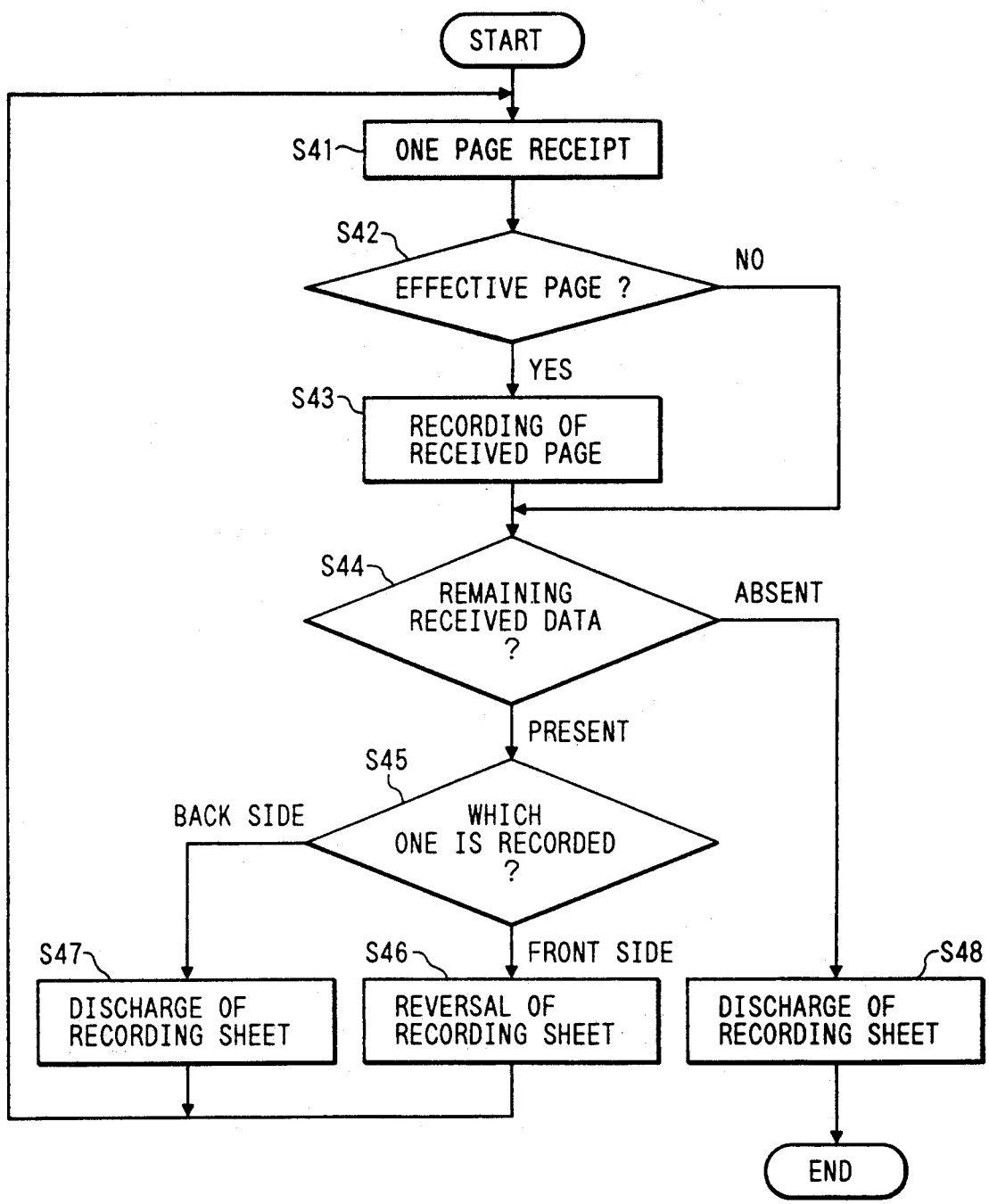

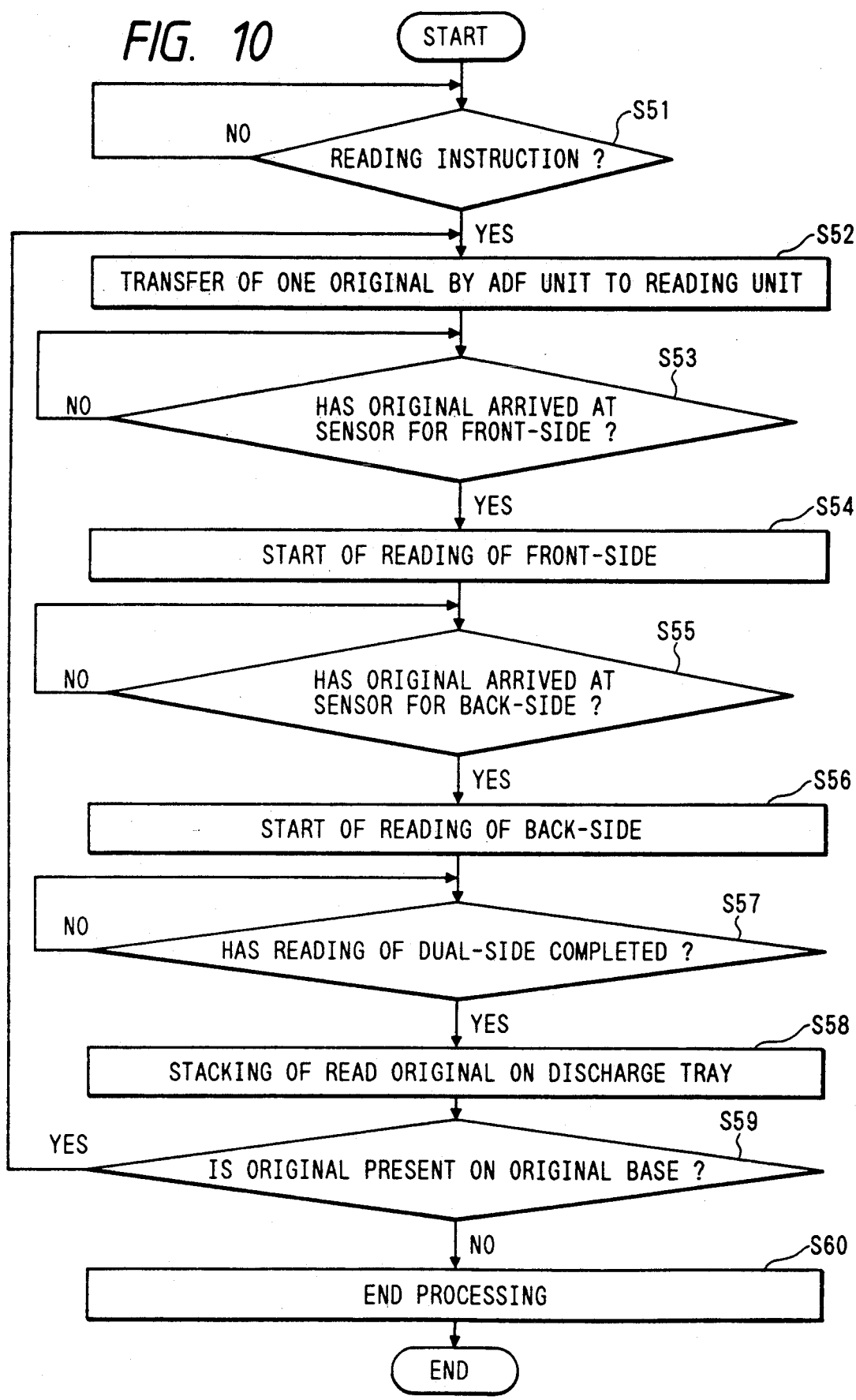

|  | DUAL-SIDE FUNCTION IDENTIFIER |
|---|---|
| HAVING NO DUAL-SIDE FUNCTION | 0 |
| HAVING DUAL-SIDE FUNCTION | 1 |

|  | MODE IDENTIFIER |
|---|---|
| SINGLE-SIDE MODE | 0 |
| DUAL-SIDE MODE | 1 |

FIG. 19(1)

| CSS |
| --- |
| Li |
| SESSION REFERENCE INFORMATION |
| Li |
| CALLING TERMINAL INSTALLATION IDENTIFIER |
| Li |
| ⋮ |
| NON STANDARD TERMINAL FUNCTION |
| Li |
| DUAL-SIDE FUNCTION IDENTIFIER |
| MODE IDENTIFIER |

FIG. 19(2)

| RSSP |
| --- |
| Li |
| SESSION REFERENCE INFORMATION |
| Li |
| CALLED TERMINAL INSTALLATION IDENTIFIER |
| Li |
| ⋮ |
| NON STANDARD TERMINAL FUNCTION |
| Li |
| DUAL-SIDE FUNCTION IDENTIFIER |
| MODE IDENTIFIER |

FIG. 20(1)

|  | DUAL-SIDE FUNCTION IDENTIFIER |
| --- | --- |
| HAVING NO DUAL-SIDE FUNCTION | 0 0 |
| HAVING DUAL-SIDE FUNCTION | 0 1 |

FIG. 20(2)

|  | MODE IDENTIFIER |
| --- | --- |
| SINGLE-SIDE MODE | 0 0 |
| DUAL-SIDE MODE | 0 1 |

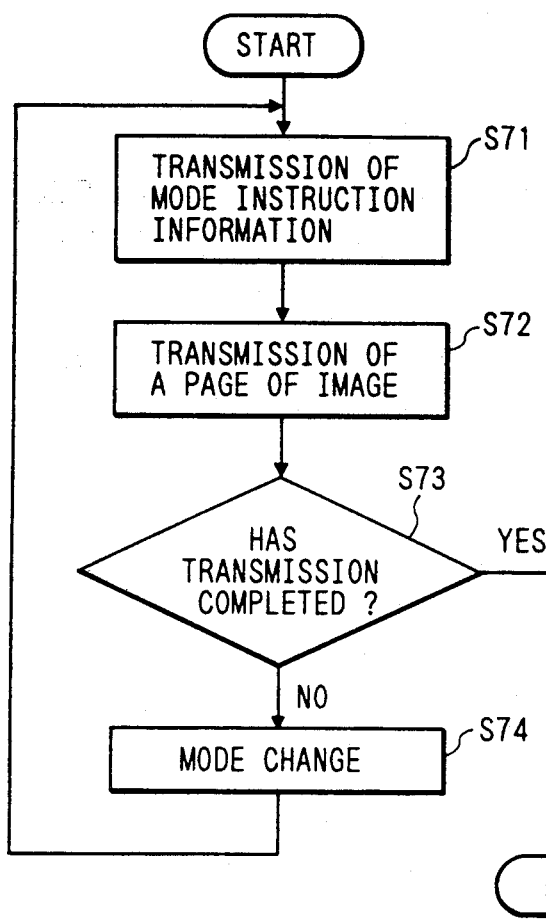
FIG. 22(1)
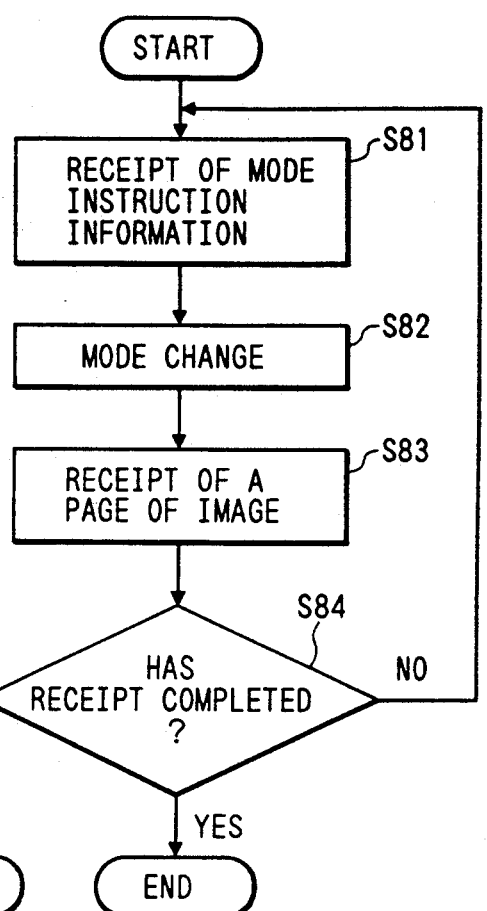
FIG. 22(2)
FIG. 23
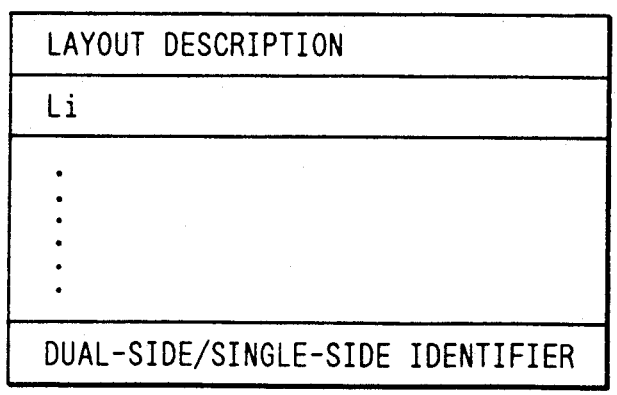

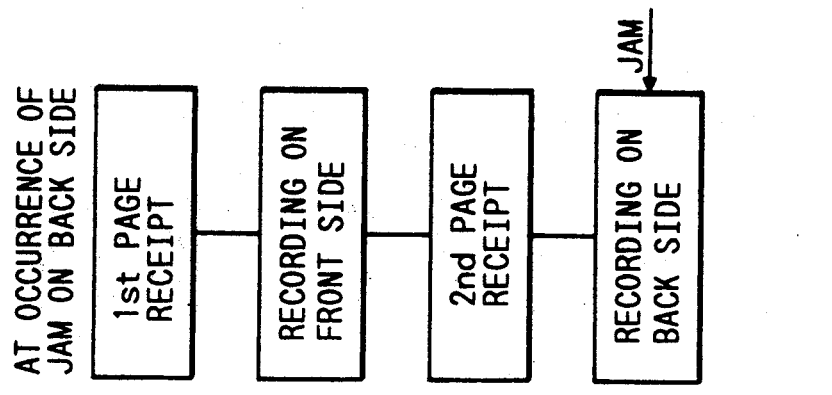
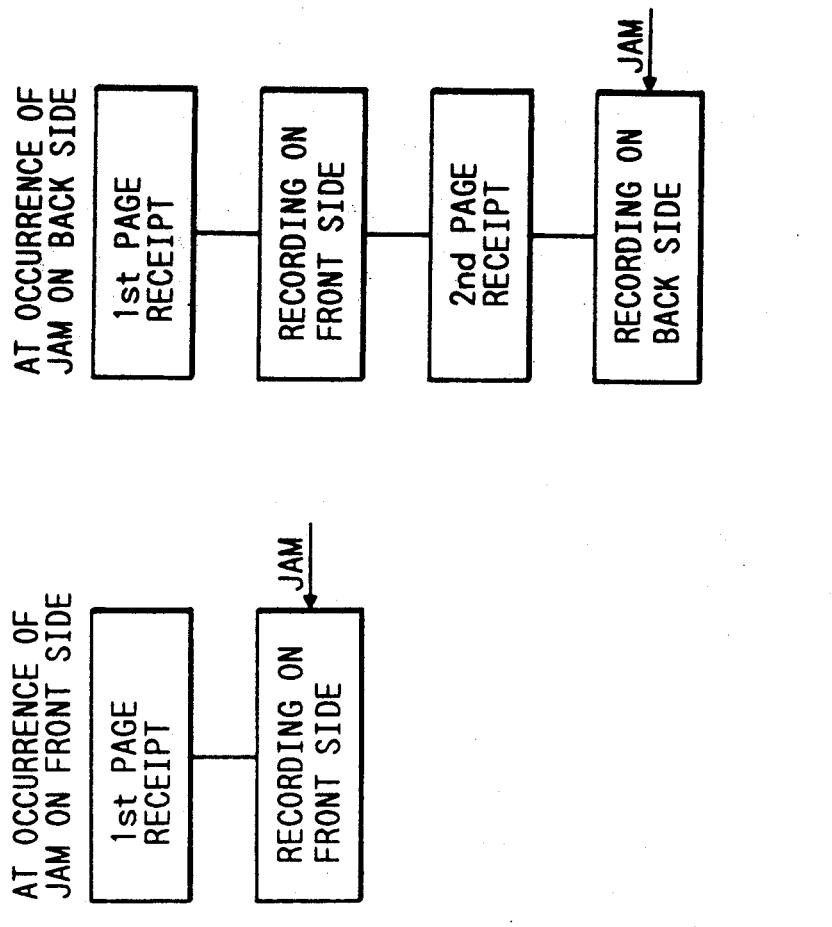
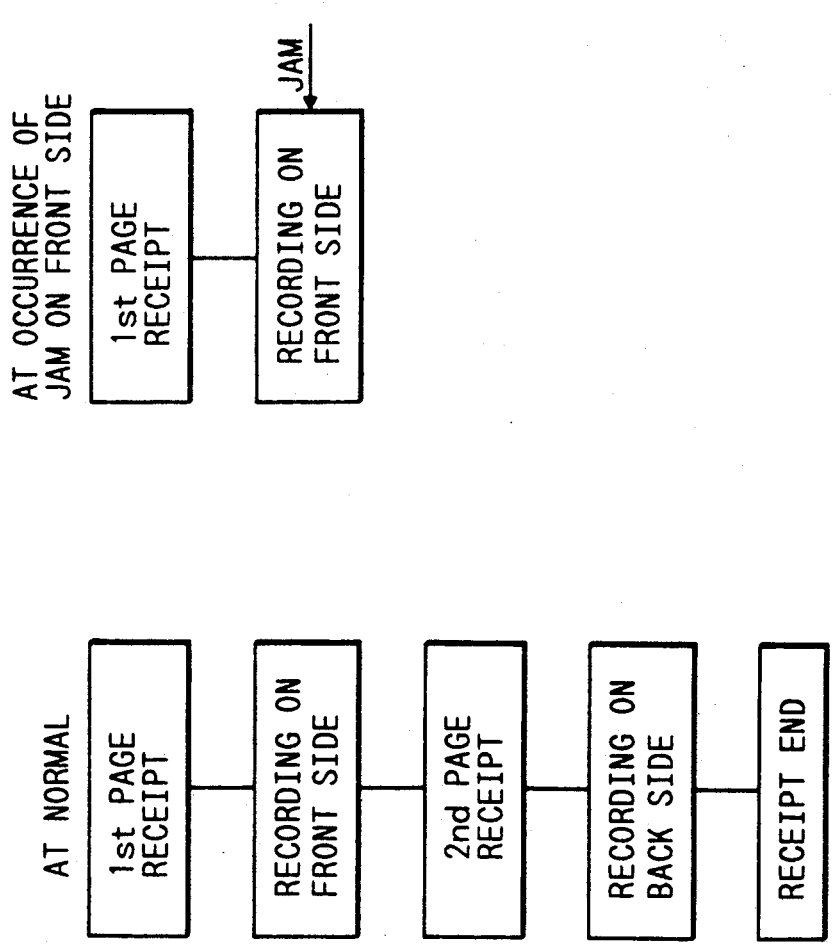

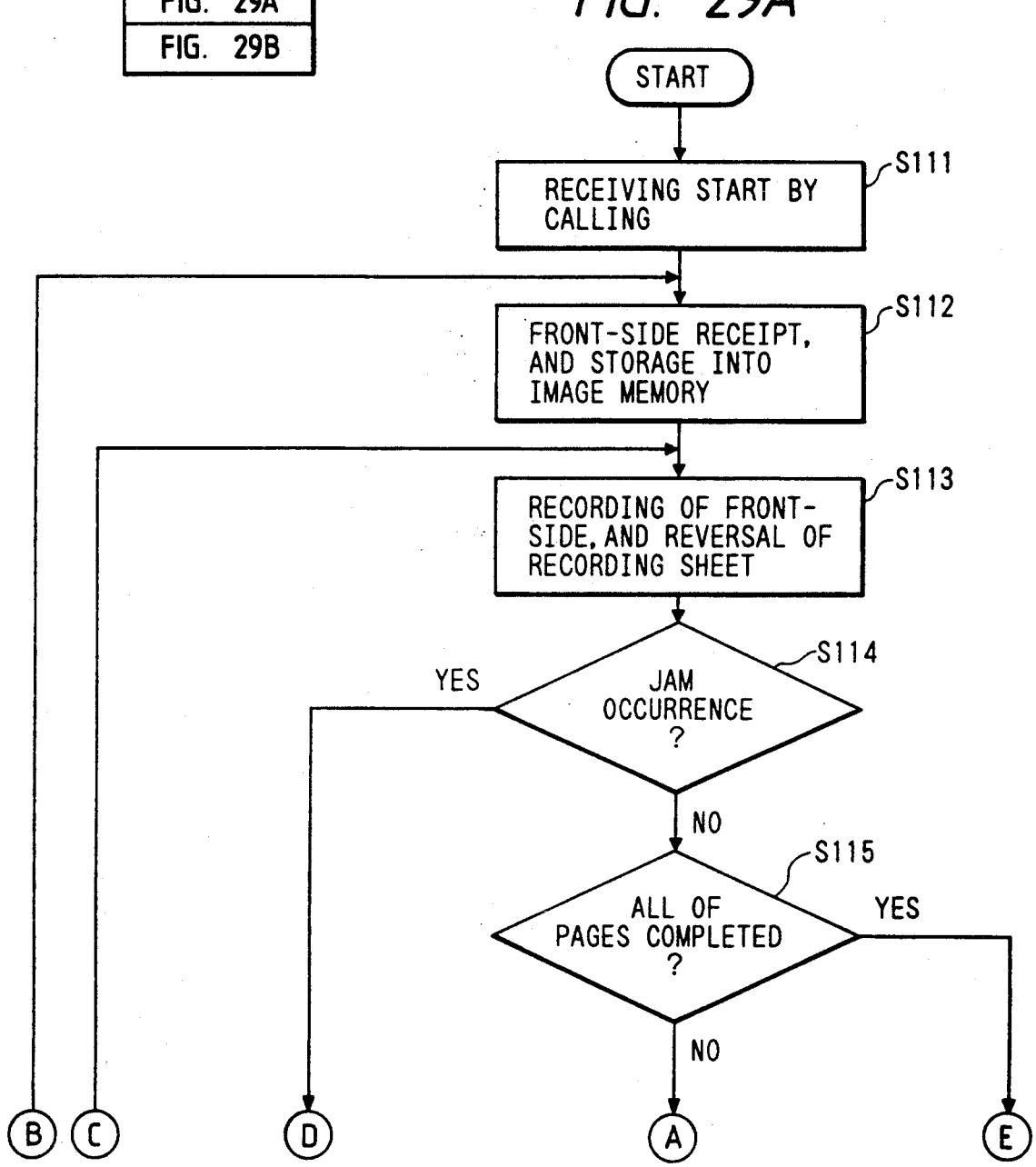

DUAL-SIDE RECORDING APPARATUS

This application is continuation of application Ser. No. 07/429,058 filed Oct. 30, 1989 now abandoned.

BACKGROUND OF THE INVENTION

The present invention relates to an image recording apparatus such as a facsimile device.

Conventionally, a facsimile device including a reader unit, a recorder unit, and a controller for controlling these units to transmit/receive data to/from another facsimile device is known.

In the facsimile device, when an original is to be transmitted, one side of each original is read one by one by an image sensor provided to the reader unit, and read data is converted to predetermined transmission data by the controller. The transmission data is transmitted to a destination facsimile apparatus through a communication control unit. Upon receipt of data, data transmitted from another facsimile device is converted to recording data, and the converted data is printed out on one side of a recording sheet by the recorder unit.

In the facsimile device, when a copying operation is to be performed, the reader unit reads one side of each original one by one, and the recorder unit prints out the read data on one side of a recording sheet.

However, in the prior art, data which can be recorded on both sides of a recording sheet can only be recorded on one side, resulting in waste of recording sheets.

SUMMARY OF THE INVENTION

The present invention has been made in consideration of the above situation, and has as its object to provide an improved image recording apparatus.

It is another object of the present invention to provide an image recording apparatus which can save recording sheets, and can easily manage recording sheets after recording.

It is still another object of the present invention to provide an image recording apparatus which can efficiently record information.

It is still another object of the present invention to provide an image recording apparatus which can facilitate a recording operation when received information is recorded.

It is still another object of the present invention to provide an image recording apparatus which can facilitate processing when a re-recording operation is necessary.

It is still another object of the present invention to provide an image recording apparatus which can record received information on both sides of a recording medium.

It is still another object of the present invention to provide an image recording apparatus which handles a previously received page of received information as a page having a smaller number, and performs dual-side recording.

It is still another object of the present invention which can discriminate effective and ineffective pages, and can sequentially record only the effective pages on both sides of a recording sheet.

It is still another object of the present invention to provide an image recording apparatus which can discriminate whether a destination apparatus has a dual-side reading function or a dual-side recording function.

It is still another object of the present invention to provide an image recording apparatus which can discriminate whether a dual-side reading function or a dual-side recording function has been set.

It is still another object of the present invention to provide an image recording apparatus which can detect completion of preparation of a recording operation, and can control a recording timing to both sides of a recording medium.

It is still another object of the present invention to provide an image recording apparatus which has an image memory of at least two pages, and retains received image data until a recording sheet on which the received image data is recorded is discharged from a recorder unit.

The above and other objects and features of the present invention will become apparent from the following description taken in conjunction with the accompanying drawings.

BRIEF DESCRIPTION OF THE DRAWINGS

FIG. 5 is a flow chart for setting an operation mode;

FIG. 6 is a plan view showing a mode setting section;

FIG. 7 is a flow chart showing an operation when a recording operation is performed for only an effective page;

FIG. 10 is a flow chart showing an operation of the reader unit;

FIGS. 19(1) and 19(2) show formats of CSS and RSSP;

FIGS. 20(1) and 20(2) are tables showing a dual-side function identifier code and a mode identifier code;

FIGS. 22(1) and 22(2) are flow charts showing operations at transmission and receiving sides when a dual-side/single-side mode is switched in units of pages;

FIG. 23 shows a format of mode instruction information;

FIGS. 28(1) to 28(3) are flow charts showing operations when an image recording operation is performed on both sides of a recording sheet.

DETAILED DESCRIPTION OF THE PREFERRED EMBODIMENTS

Figure 1:
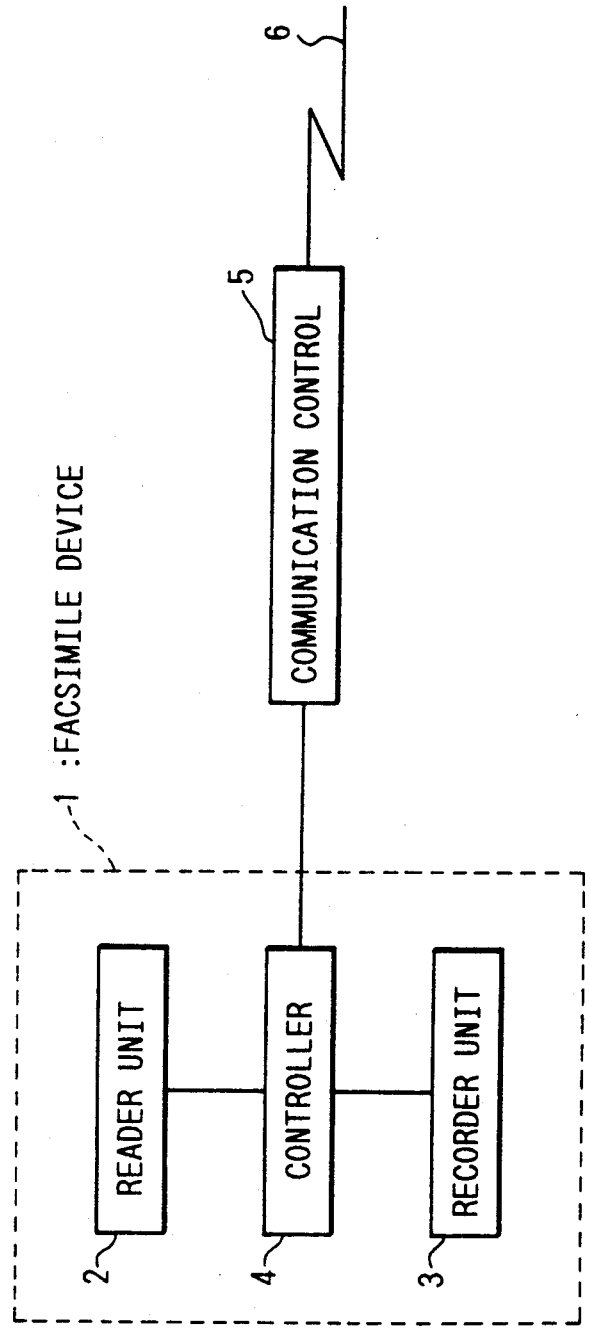
FIG. 1 is a block diagram of a facsimile device to which the present invention can be applied.

FIG. 1 is a schematic block diagram of a facsimile device 1 according to an embodiment of the present invention.

The facsimile device 1 comprises a reader unit 2 capable of reading both sides of an original, a recorder unit 3 capable of recording on both sides of a recording sheet, and a controller 4 for controlling the reader unit 2 and the recorder unit 3. The controller 4 is connected to a communication network 6 through a communication control unit 5 incorporating a modem and a DSU (digital service unit).

Figure 2:
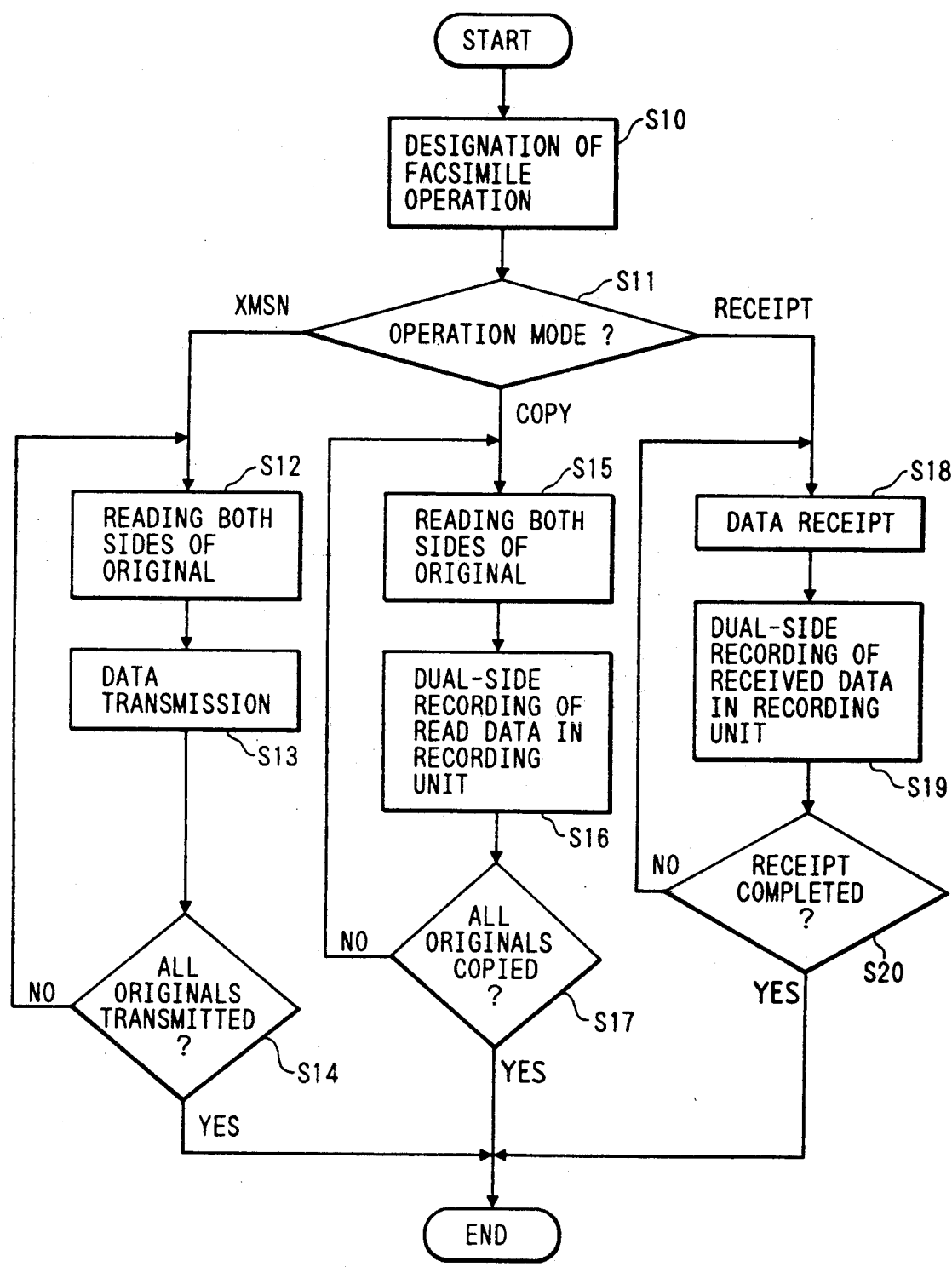
FIG. 2 is a flow chart showing a basic operation of the facsimile device.

FIG. 2 is a flow chart showing basic operations, i.e., transmission, receipt, and copying operations in a dual-side processing mode in the facsimile device 1.

While the dual-side processing mode is set, an operation mode of the facsimile device is designated (S10). When a transmission mode is selected (S11), the reader unit 2 reads both sides of an original (S12). The communication control unit 5 converts the read data into predetermined transmission data, and transmits it to a destination facsimile device (S13). When data is transmitted, data for both sides of the original can be simultaneously transmitted by using a 2-channel communication interface. Alternatively, data for both sides of the original can be sequentially transmitted for each side by using a one-channel communication interface.

The above-mentioned operation is sequentially executed for set originals. When transmission of all the originals is completed (S14), the processing is ended.

When a copy mode is selected in step S11, the reader unit 2 reads both sides of an original, and the recorder unit 3 records the read data on both sides of a recording sheet (S16). In dual-side recording at the recorder unit 3, in a receipt mode, a previously received page is handled as a page having a smaller number (front side), as will be described later. In the copy mode, however, front and back sides of dual-side recording are determined in correspondence with a set state of originals at the reader unit 2. When the copying operation of all the originals is completed (S17), the processing is ended.

Upon receipt of data, the communication control unit 5 receives data from an external device (S18). The received data is developed to image data by the controller 4 to be converted to recording data. Thereafter, the recorder unit 3 records the recording data on both sides of a recording sheet (S19).

In dual-side recording, a previously received page of received data is handled as a page having a smaller number. More specifically, the first page of received data is recorded on the front side of a first recording sheet, and the second page of the received data is recorded on the back side of the first recording sheet. Furthermore, for the following received data, odd-numbered pages are recorded on front sides of recording sheets, and even-numbered pages are recorded on back sides of the recording sheets. Thus, the received data can be automatically recorded on both sides of each recording sheet without requiring special operations.

When receipt is completed (S20), the processing is ended.

Figure 3:
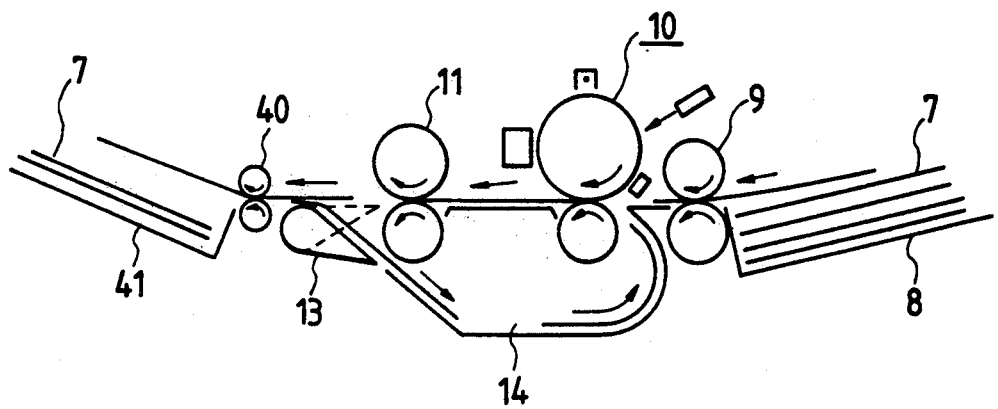
FIG. 3 is a side view showing an arrangement of a recorder unit.

FIG. 3 is a side view showing an arrangement of the recorder unit 3.

The recorder unit is arranged as a laser beam printer, and comprises a paper cassette 8 in which recording sheets 7 are set, paper feed rollers 9, a recording unit 10 consisting of a laser scanner, a photosensitive drum, a developing device, and the like, fixing rollers 11, a reversal selector 13, a reversal mechanism 14, discharge rollers 40, and a discharge tray 41.

The recorder unit performs recording on both sides of a recording sheet in the dual-side recording mode. In the dual-side recording mode, after a recording operation is performed on the front side of the recording sheet 7 by the recording unit 10 and the fixing rollers 11, the recording sheet 7 guided toward the discharge tray 41 is guided to the reversal mechanism 14 upon reversal rotation of the discharge rollers 40 and the operation of the reversal selector 13, thereby feeding the recording sheet to the recording unit 10. Then, a recording operation is performed on a back side, and the recording sheet is stacked on the discharge tray 41.

Figure 4:
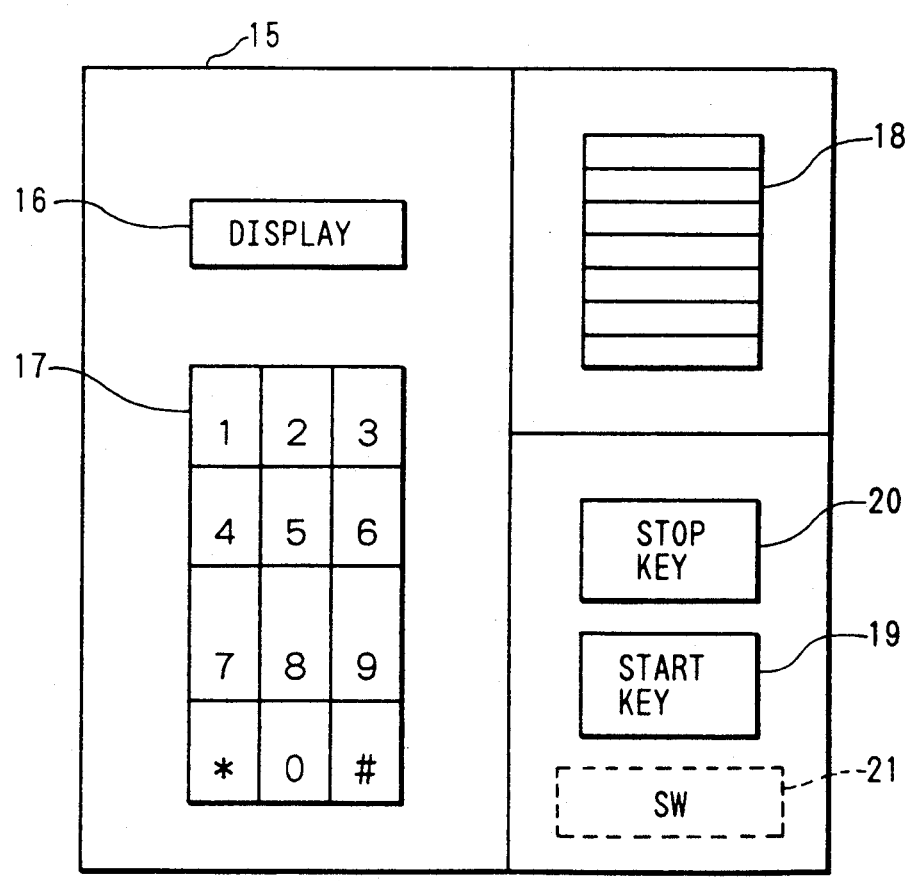
FIG. 4 is a plan view showing an operation unit of the facsimile device.

FIG. 4 is a plan view showing an arrangement of an operation unit of the facsimile device 1.

The operation unit 15 includes a display unit 16, a ten-key pad 17, one-touch keys 18, a start key 19, a stop key 20. A mode setting section 21 includes switches for setting various modes and LEDs for indicating the set mode, as shown in FIG. 6.

In the facsimile device 1, each of reading and recording processing modes can be switched from dual-side processing to single-side processing upon operation of change over switches 25 and 26, provided to the mode setting section 21 (to be described later), for designating modes.

FIG. 5 is a flow chart for explaining a procedure when the dual-side/single-side processing mode is designated.

In this embodiment, upon designation of the operation of the facsimile device (FIG. 2: S10), density, resolution, dual-side/single-side reading, and dual-side/single-side recording modes are set. In this case, as default data, the density=normal, the resolution=200 dpi, the recording mode=dual-side reading mode, and the recording mode=dual-side recording mode are set. The device resumes this mode upon power-on or completion of transmission, receipt, or copy processing (S31).

These setting data can be designated by change over switches 23 to 26 of the mode setting section 21 shown in FIG. 6, and are indicated by LED indicators 27 to 34 arranged in correspondence with the switches 23 to 26.

The first change over switch 23 is used to designate the resolution. When the LED indicator 27 is set ON, the resolution of 200 dpi is designated; when the LED indicator 28 is set ON, the resolution of 400 dpi is designated.

The second change over switch 24 is used to designate the density. When the LED indicator 29 is set ON, a normal density is designated; when the LED indicator 30 is set ON, a dark density is designated.

The third change over switch 25 is used to designate the dual-side or single-side reading mode. When the LED indicator 31 is set ON, the dual-side reading mode is designated; when the LED indicator 32 is set ON, the single-side reading mode is designated.

The fourth change over switch 26 is used to designate the dual-side or single-side recording mode. When the LED indicator 33 is set ON, the dual-side recording mode is designated; when the LED indicator 34 is set ON, the single-side recording mode is designated.

When the setting data are to be changed in step S31, the change over switches 23 to 26 are operated to change the setting data (S32). After the setting data are changed, ON states of the LED indicators corresponding to the change over switches are switched (S33), and an operation mode (transmission, copy, or receipt mode) is designated (S34). When no setting data are changed, the operation mode is designated in the default state. Note that the change over operation of the setting data may be displayed not only on the LED indicators but on the display unit 16.

As described above, in the facsimile device, since the recorder unit has the dual-side recording function, image data can be recorded on both sides of a recording sheet, thus saving recording sheets.

Since the number of recorded sheets can be decreased, when the recording sheets are filed as a received document, management of the document can be facilitated.

In addition, since a means for selectively switching the dual-side/single-side recording mode is added, certain received information can be recorded in a mode suitable for the content of the received information.

Since a previously received page of received data is handled as a page having a smaller number, no special operation is required in dual-side recording, and a dual-side recording operation in receipt can be facilitated.

The facsimile device of the present invention may be arranged so that blank pages in recording data in the copy mode or in received data in receipt mode are detected, and effective pages other than the blank pages are sequentially recorded.

FIG. 7 is a flow chart showing an operation performed when recording is performed for only effective pages, as described above.

It is checked if each of received pages is an effective page (S41 and S42). This decision is achieved by counting the number of changed pixels of image data when received data (MMR-encoded data) is decoded into image data. When the count value is smaller than a predetermined value, it is determined that the corresponding page is a blank page, and is ineffective. Note that the above-mentioned processing is executed by the controller 4.

When an effective page is determined, the image data is recorded (S43); when an ineffective page is determined, no recording is performed for the corresponding page.

When received data remains (S44), it is checked if the recording operation is performed on the front or back side of a recording sheet in step S43 (S45). If it is determined that the recording operation is performed on the front side, the recording sheet is to be reversed to perform a recording operation on the back side, and the flow returns to step S41 (S46). However, if it is determined that the recording operation is performed on the back side, the recording sheet is discharged (S47), and the flow returns to step S41. Then, a new recording sheet is fed from the cassette 8, and a recording operation is performed on this recording sheet.

If it is determined in step S44 that received data is absent, the recording sheet is discharged, and processing is ended (S48).

Figure 8:
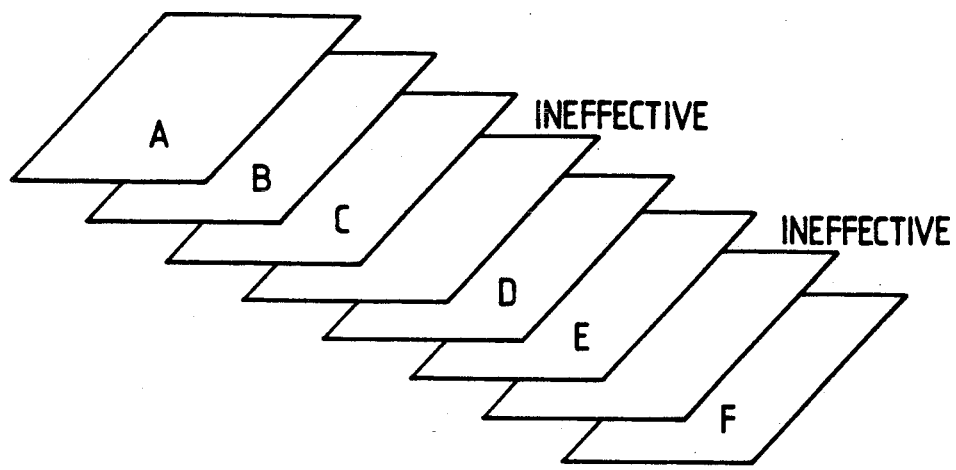
FIGS. 8(1) to 8(3) are views showing the relationship between an original group in which blank originals are mixed and dual-side recorded recording media.
Figure 8:
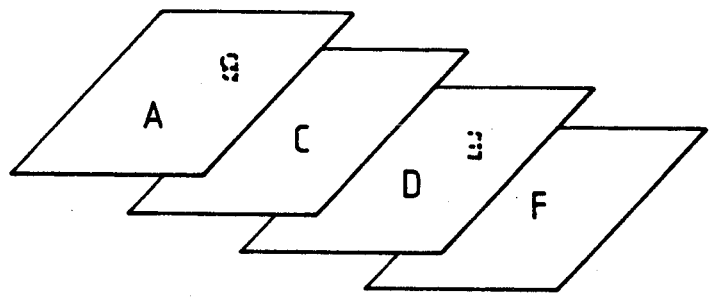
Figure 8:
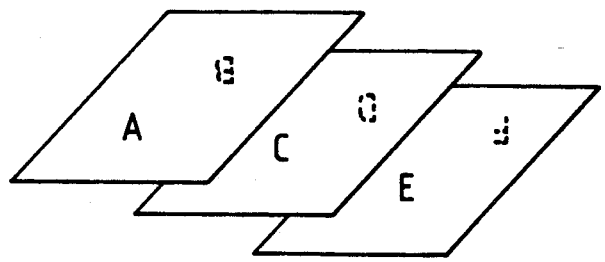

FIGS. 8(1) to 8(3) are views for, when originals in which blank originals are mixed in normal single-side originals are transmitted from a transmission side, explaining a case wherein the originals are dual-side recorded as they are in comparison with a case wherein only effective pages are selected and are dual-side recorded.

As shown in FIG. 8(2), when originals are dual-side recorded as they are, recording sheets include those whose back sides are blank. However, when the effective pages are selected and are dual-side recorded, recording sheets can be subjected to dual-side recording without forming a blank side.

This operation is similarly performed in the copy mode.

As described above, in this facsimile device, of received information or read image information, only pages determined effective pages are sequentially recorded on both sides of a recording sheet. Therefore, waste of recording sheets can be prevented without forming a blank page, and received information can be efficiently recorded.

The facsimile device of the present invention may be arranged to be able to confirm if a destination device has a dual-side reading function or a dual-side recording function. This embodiment will be described below.

Figure 9:
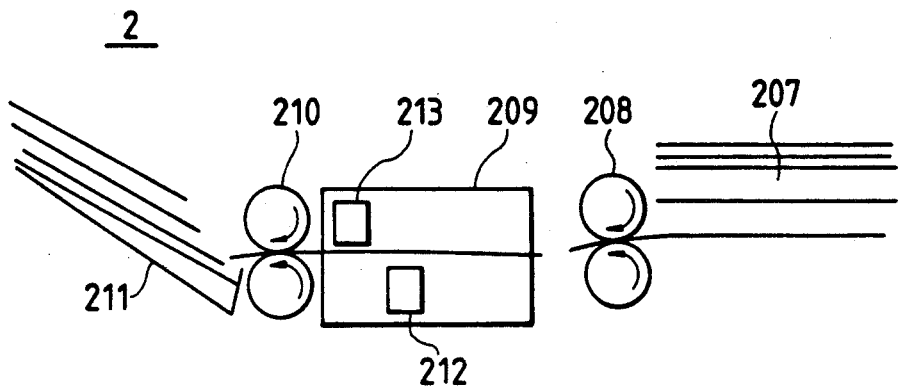
FIGS. 9 and 11 are side views showing an arrangement of a reader unit having a dual-side reading function.

FIG. 9 is a side view showing an arrangement of a reader unit 2.

In the reader unit 2, originals are set on an original table while being stacked in the order starting from the lower side. The reading unit 2 comprises an ADF unit 208 consisting of separation and paper feed rollers, an original reading unit 209 for reading front and back sides of an original 207, and discharge rollers 210 for feeding the original 207 discharged from the original reading unit 209 onto a discharge tray 211.

The original reading unit 209 has two contact image sensors (to be referred to as contact sensors hereinafter) 212 and 213 which oppose the front and back sides of the original 207, respectively. The contact sensors 212 and 213 read images formed on both sides of the original 207 at a time. The contact sensors 212 and 213 respectively read the front and back sides of the original 207. The contact sensor 212 arranged at the lower side in this embodiment is arranged at a position where the original 207 arrives earlier than the position of the contact sensor 213.

FIG. 10 is a flow chart showing an operation of the reader unit 2.

When a reading instruction is input from the controller 4 (S51), the original 207 is conveyed to the original reading unit 209 by the ADF unit 208 (S52). When the original 207 arrives the front-side contact sensor 212 (S53), the sensor 212 starts reading of the front side of the original (S54). When the original 207 arrives the back-side contact sensor 213 (S55), the sensor 213 starts reading of the back side of the original (S56).

When reading of both sides is completed (S57), the read original 207 is stacked on the discharge tray 211 (S58).

The above operation is repeated. When there is no original 207 on the original table (S59), end processing for informing the end of operation is performed by enabling a buzzer or displaying a message (S60), and the original reading operation is ended.

Figure 11:
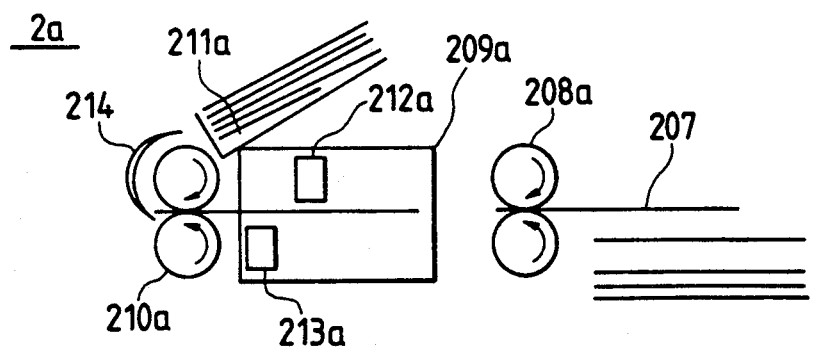

FIG. 11 is a side view showing another arrangement of a reader unit.

In a reader unit 202a, originals 207 are set while being stacked in the order starting from the upper side. The reader unit 202a comprises an ADF unit 208a, an original reading unit 209a, and discharge rollers 210a. An original 207 is turned over by a guide 214, and is then discharged on a discharge tray 211a. In this case, in the original reading unit 209a, a contact sensor 212a for reading the front side of the original 207 is arranged at an upper position, and a contact sensor 213a for reading the back side of the original 207 is arranged at a lower position. In this embodiment, the front-side contact sensor 212a is arranged at a position where the original arrives earlier than the position of the back-side contact sensor 213a. The dual-side reading operation of the original 207 is performed in the same manner as in FIG. 10.

Note that in place of the contact sensors in the reading unit, image sensors comprising optical systems each including a lens, a mirror, and a CCD may be used.

Figure 12:
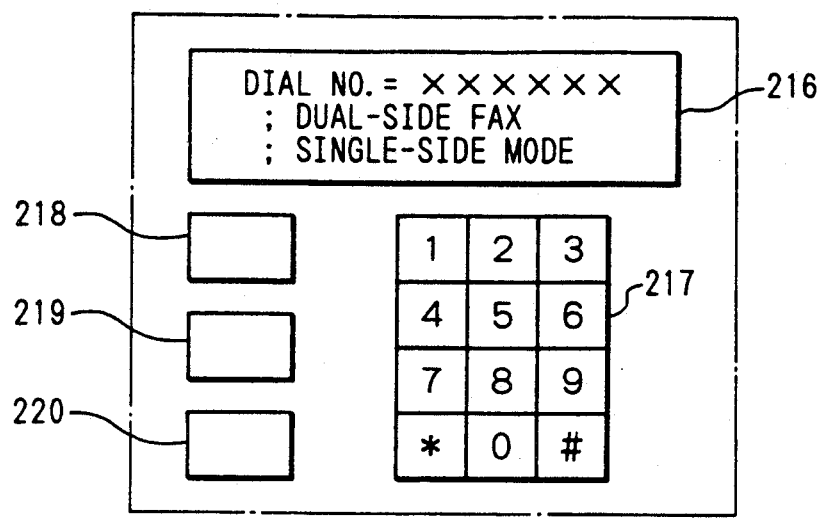
FIG. 12 is a plan view showing an arrangement of an operation unit of a facsimile device having an inquiry function.

FIG. 12 is a plan view showing an arrangement of an operation unit of the facsimile device 1 of this embodiment.

An operation unit 215 includes a display unit 216, a ten-key pad 217, a one-touch dial key 218, a start key 219, and an inquiry key 220.

Of these keys, the inquiry key 220 is used to inquire of a destination device whether or not a destination facsimile device has a dual-side reading function or a dual-side recording function and whether or not the destination apparatus is set in a mode for executing the dual-side processing when the destination device has the dual-side function.

Figure 13:
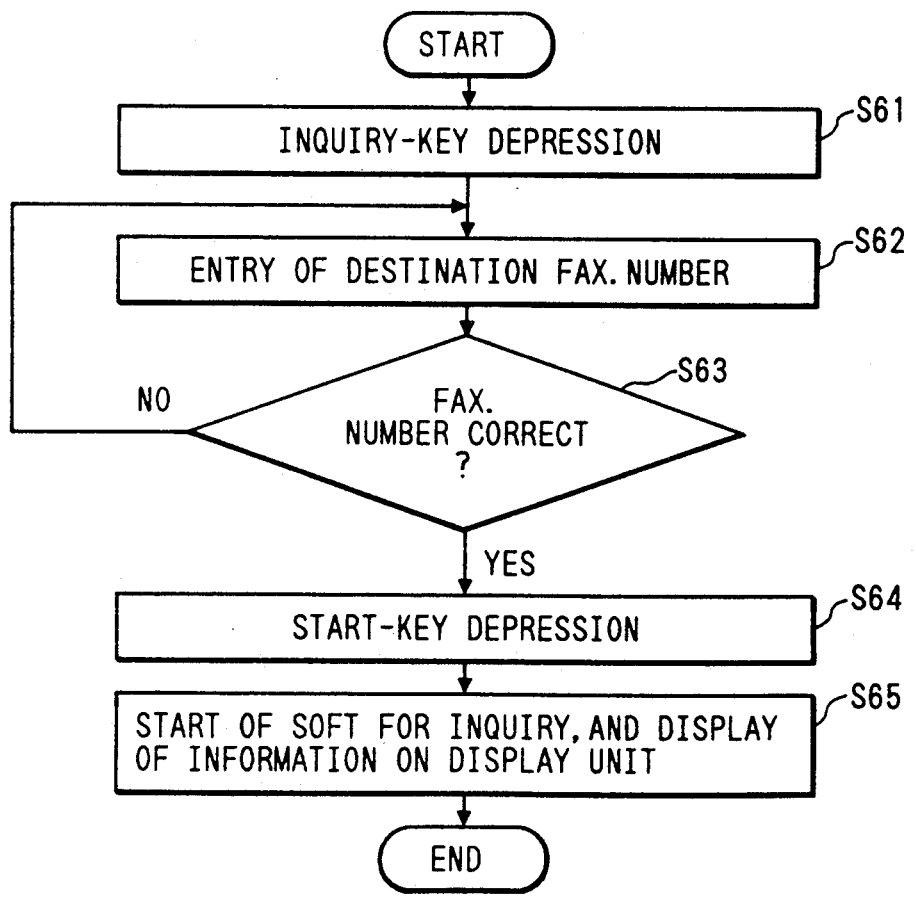
FIG. 13 is a flow chart showing an inquiry procedure.

FIG. 13 is a flow chart showing an inquiry procedure.

The inquiry key 220 is depressed (S61), and a destination facsimile (FAX) number is then input using the ten-key pad 217 (S62). After it is confirmed that the input number is correct (S63), the start key 219 is depressed (S64), thereby starting inquiry software (S65). In addition, the contents of the processing functions and setting mode of the destination facsimile device are displayed on the display unit 216 (S66).

The inquiry software in step S65 will be described below.

Figure 14:
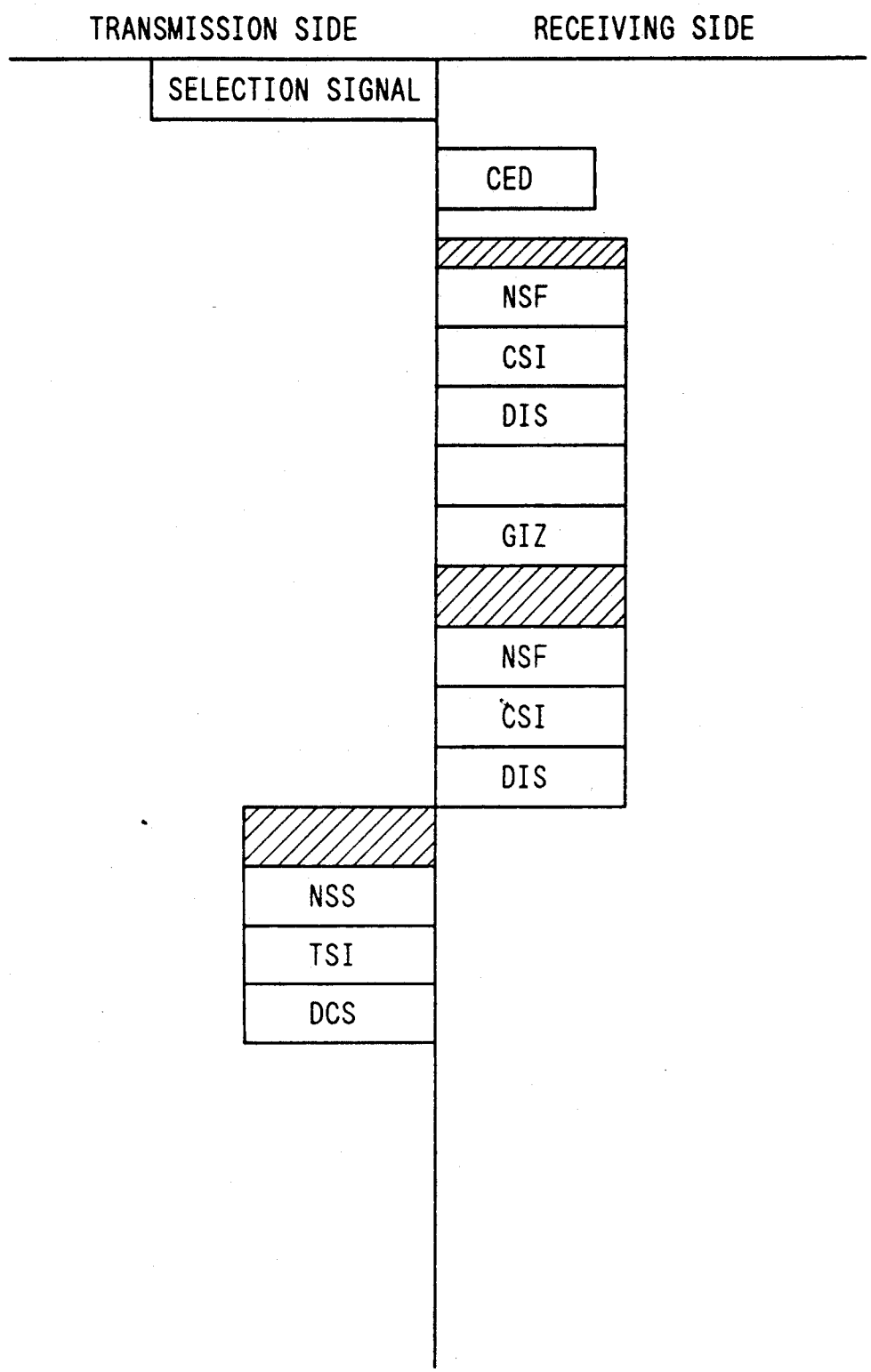
FIG. 14 is a chart showing inquiry procedures in a G3 facsimile device.

FIG. 14 is a chart showing inquiry procedures in a G3 facsimile device.

Procedures and signals shown in FIG. 14 comply with the CCITT recommendation T30, and a detailed description thereof will be omitted.

Figures 15, 16:
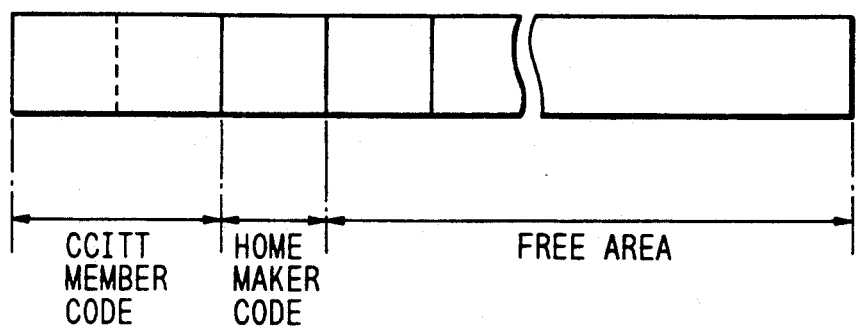
FIG. 15 shows a format of an information field in NSF and NSS.
FIGS. 16(1) and 16(2) are tables showing a dual-side function identifier code and a mode identifier code.

In FIG. 14, signals NSF and NSS are used for informing a non-standard function to a destination facsimile device. More specifically, in an information field of each of these signals, first and second octets are assigned to a CCITT member code, a third octet is assigned to a home maker code, and a fourth octet is assigned to a free area, as shown in FIG. 15. Thus, a dual-side function identifier code indicating the presence/absence of the dual-side function and a mode identifier code indicating a mode when the device has the dual-side function are set in the free area. For example, as shown in FIGS. 16(1) and 16(2), when the dual-side function identifier code is "1", this defines that the device has the dual-side function; when it is "0", defines that the device has no dual-side function. When the mode identifier code is "1", this defines that the dual-side mode is set; when it is "0", this defines that the single-side mode is set.

A case will be exemplified below wherein the transmission side requests dual-side recording. In this case, when the received signal NSF indicates the presence of the dual-side recording function and the single-side mode, an instruction for performing recording in the dual-side mode (i.e., the dual-side function identifier code=1 and the mode identifier mode code=1) is superposed on the signal NSS and is transmitted.

Figure 17:
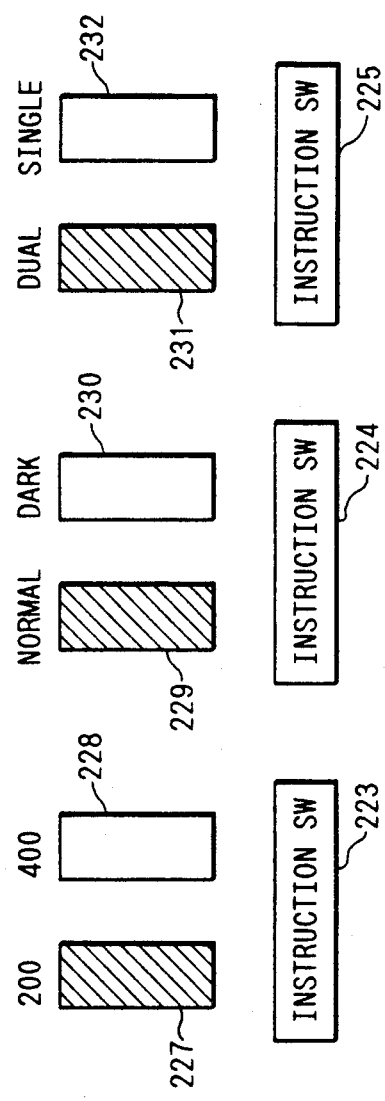
FIG. 17 is a plan view showing an instruction switch and LED indicators of the mode setting section of the facsimile device.

In one method of designating the recording mode of the destination facsimile device, a destination mode instruction switch 225 is arranged in addition to a resolution instruction switch 223, a density instruction switch 224, and the like, as shown in FIG. 17, so that the identifier code of the signal NSS can be changed over upon operation of the switch 225. Note that LED indicators 227 to 232 are arranged two each in correspondence with the instruction switches 223 to 225. A desired mode is set while observing ON states of the indicators 231 and 232 according to the depression state of the destination mode instruction switch 225. These switches are arranged on the operation unit shown in FIG. 12.

When it is identified in communication that the transmission side facsimile device has the dual-side reading function and the receiving side facsimile device has the dual-side recording function, the transmission side device instructs one of the dual-side and single-side modes for image transmission to the receiving side device, and the receiving side device changes over the dual-side/single-side recording mode on the basis of this instruction. In this manner, receipt in a state requested by the transmission side is allowed.

In this embodiment, the G3 facsimile device has been exemplified. The same applies to a G4 facsimile device.

Figure 18:
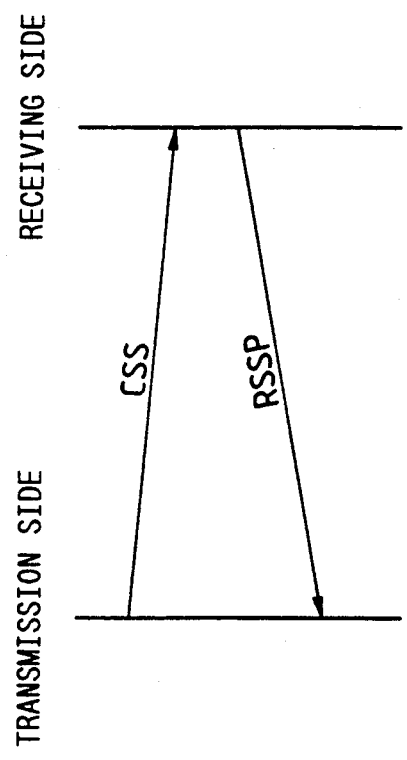
FIG. 18 is a chart showing inquiry procedures in a G4 facsimile device.

FIG. 18 is a chart showing inquiry procedures in a G4 facsimile device.

In this case, a signal CSS (session start command) is sent in a session layer, and a signal RSSP (session start response) is received. FIGS. 19(1) and 19(2) show formats of the signals CSS and RSSP. As shown in FIGS. 19(1) and 19(2), the signal RSSP includes characteristic information of a destination terminal. The presence/absence of the dual-side function of a receiving side facsimile device and a setting mode when the dual-side function is present are identified from a dual-side function identifier code and a mode identifier code of non-standard terminal functions. More specifically, as shown in FIGS. 20(1) and 20(2), when the dual-side function identifier code is "00", the absence of the dual-side recording function is determined; when it is "01", the presence of the dual-side recording function is determined.

A recording mode can be designated in a destination facsimile device in the same manner as in the G3 facsimile device.

The facsimile device may be arranged so that an instruction from a transmission side device is ignored at a receiving side device, and the receiving side device performs recording without changing its mode.

Figure 21:
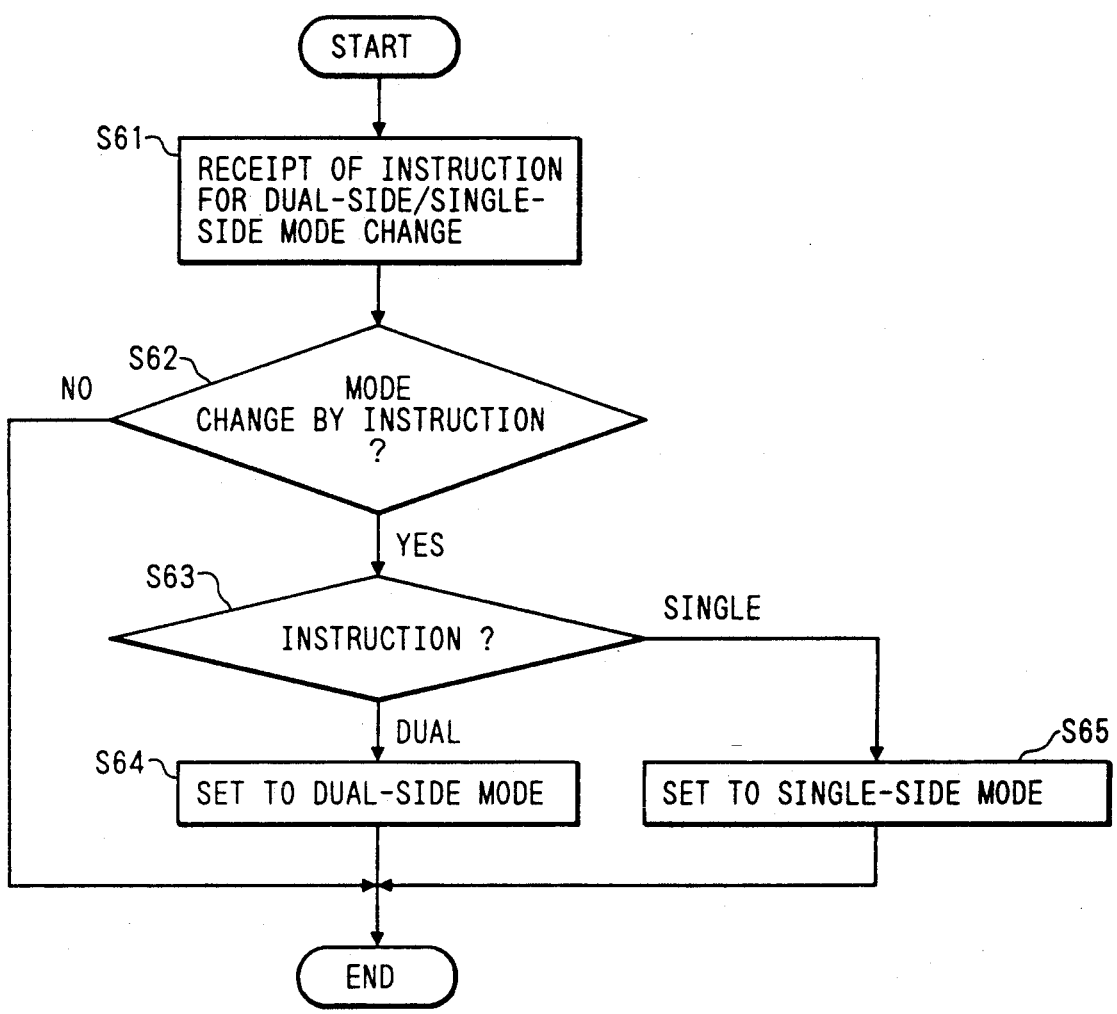
FIG. 21 is a flow chart showing an operation of a receiving-side facsimile device.

FIG. 21 is a flow chart showing an operation of a receiving side facsimile device in this case.

The receiving side device receives the above-mentioned dual-side/single-side mode instruction from the transmission side device (S61), and checks if the recording mode is changed in accordance with the instruction (S62). More specifically, in this case, an instruction switch 226 is added, as indicated by a broken line in FIG. 17, so that the receiving side device can select whether or not the instruction from the transmission side device is ignored. The processing mode is determined by referring to setting of this mode setting switch.

When the instruction from the transmission side device is ignored, the dual-side/single-side mode is not changed, and a recording operation is performed in the setting mode. When the dual-side/single-side mode is changed in accordance with the instruction from the transmission side device, if the instruction from the transmission side indicates the dual-side mode (S63), the dual-side recording mode is set (S64); if the instruction indicates the single-side mode, the single-side recording mode is set (S65), thus performing a recording operation.

The dual-side/single-side change instruction described above can be issued from a transmission side device even if the transmission side device has no dual-side function. For example, this can be realized by arranging a destination mode instruction switch, as shown in FIG. 17.

The dual-side/single-side change instruction described above from a transmission side device may be issued in units of pages of transmission originals. In this case, mode instruction information is transmitted between pages of image information, and a receiving side device changes the dual-side/single-side mode in response to this instruction.

FIGS. 22(1) and 22(2) are flow charts showing an operation when a dual-side/single-side mode is changed in units of pages. FIG. 22(1) shows an operation at a transmission side, and FIG. 22(2) shows an operation at a receiving side.

After the transmission side device transmits mode instruction information (S71), it transmits image information for one page (S72). If transmission is not completed yet (S73), setting of the mode instruction information is changed as needed (S74), and the flow returns to step S71 to transmit the mode instruction information.

The receiving side device receives the mode instruction information (S81), and changes a mode based on the mode instruction information (S82). The receiving side device receives image information for one page in accordance with the changed mode (S83). If receipt is not completed yet (S84), the flow returns to step S81 to receive the next mode instruction information.

FIG. 23 shows a format of the mode instruction information.

The mode instruction information includes a dual-side/single-side identifier in a user readable comment area present in a page descriptor of a presentation layer.

In FIGS. 22(1) and 22(2), the mode instruction information is transmitted regardless of the presence/absence of mode change. However, the mode instruction information may be transmitted when a mode is to be changed.

When received data or read data are sequentially recorded on both the front and back sides of a recording sheet, the facsimile device may be arranged so that recording data for the front and back sides are supplied upon detection of completion of preparation of a recording operation.

Figure 24:
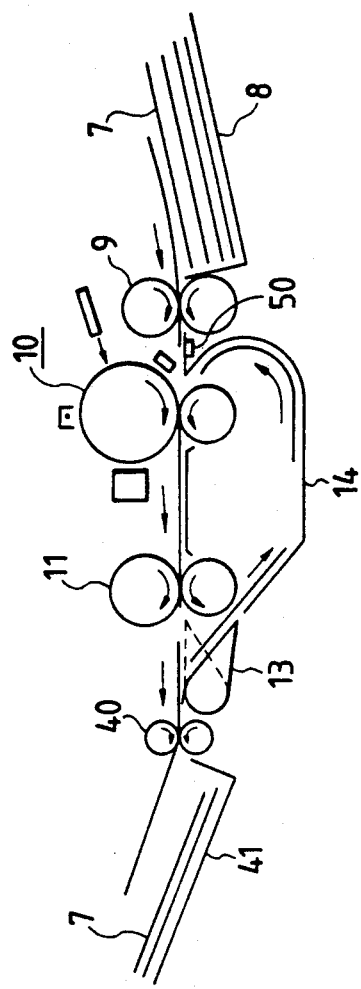
FIG. 24 is a side view showing an arrangement of another embodiment of a recorder unit.

FIG. 24 shows an arrangement of this embodiment, and the same reference numerals in FIG. 24 denote the same parts as in FIG. 3. A head bearing sensor 50 detects the leading end of a recording sheet fed from a cassette 8 or a reversal mechanism 14, and then causes a controller 4 to supply image data.

Figure 25:
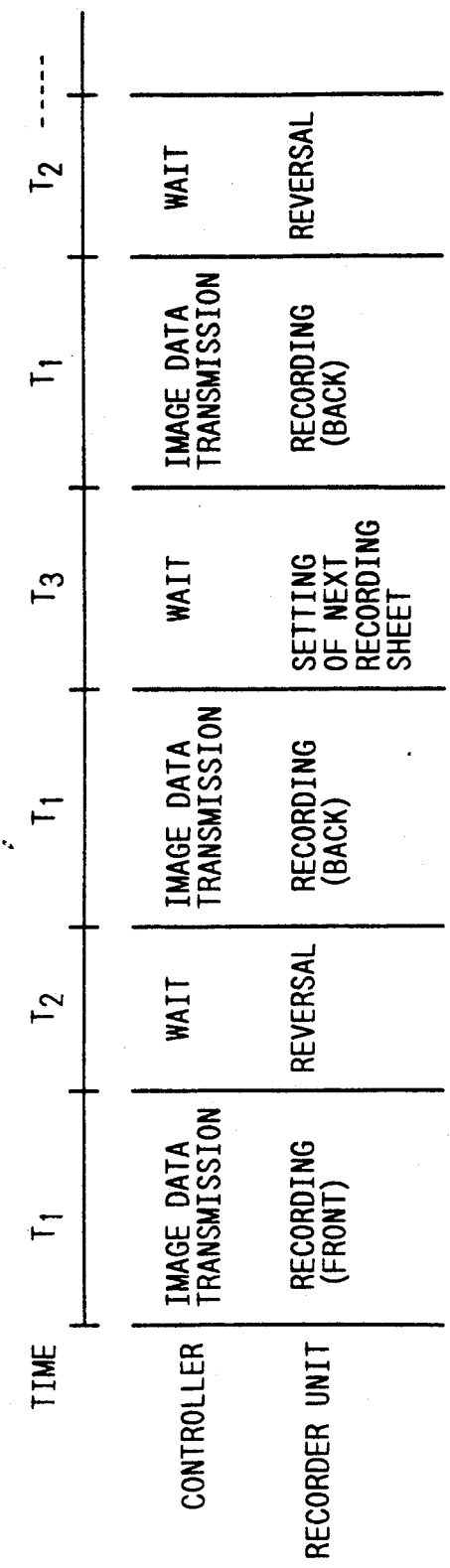
FIG. 25 is a timing chart for explaining timings when a recording operation is performed on both sides of a recording sheet.

FIG. 25 is a timing chart for explaining timings when a recording operation is performed for each page of recording sheets in the recorder unit described above.

In FIG. 25, a one-page recording operation requires a time $T_1$. After a recording operation of a front side is completed, a wait time $T_2$ is required until a recording sheet is reversed and a recording operation of a front side is started. After the recording operation of the back side is completed, a wait time $T_3$ is required until the next recording sheet is fed, and the recording operation of the front side is started. As shown in FIG. 25, since the recording operations for the front and back sides of a recording sheet have different convey paths of the recording sheet, the wait times $T_2$ and $T_3$ are often different from each other. In the facsimile device of this embodiment, the head bearing sensor 50 is arranged at an entrance of a recording unit 10, as described above, and an output timing of image data from the controller 4 is controlled on the basis of the detection timing, thereby assuring recording operations at proper timings on both the front and back sides of the recording sheets.

Figure 26:
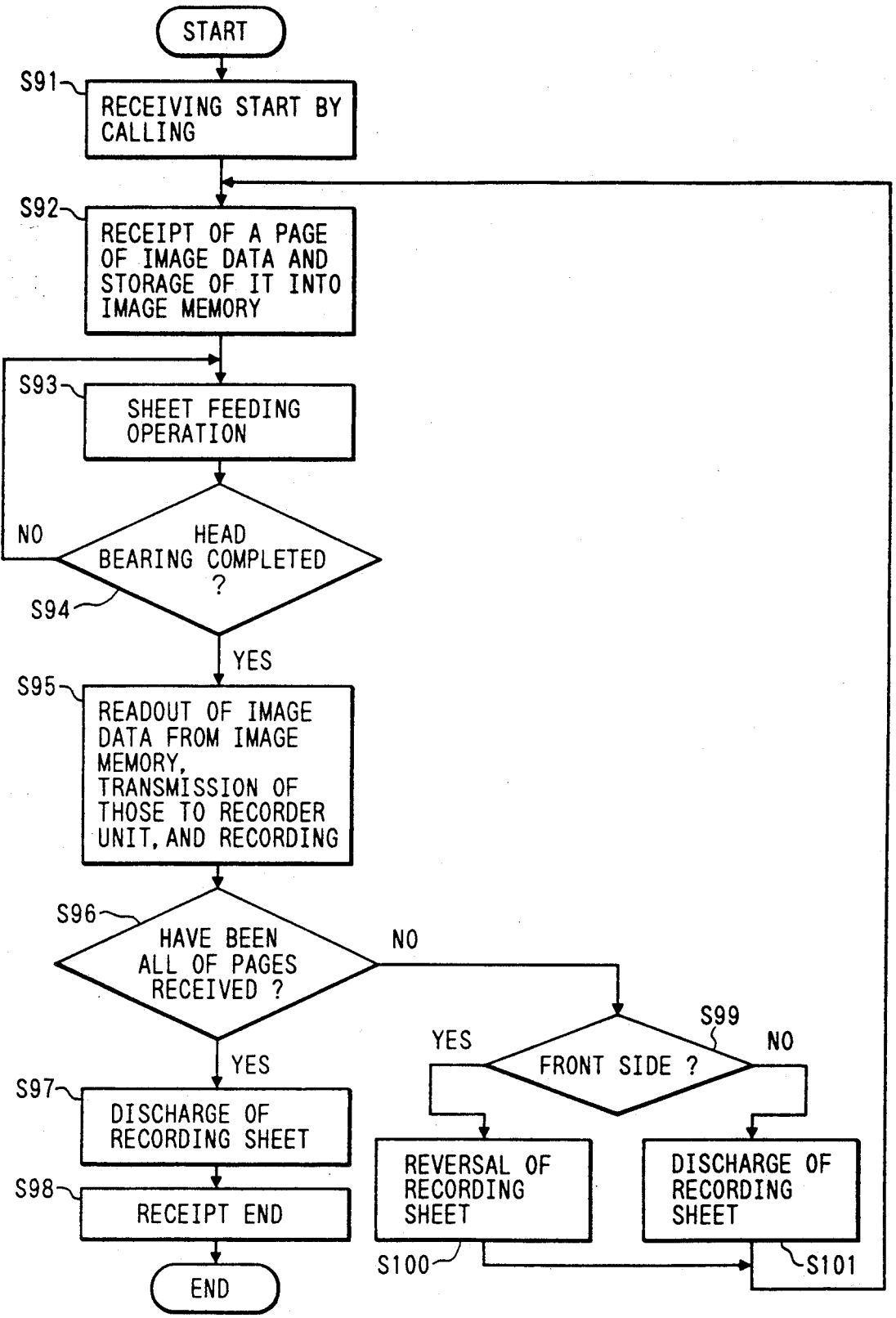
FIG. 26 is a flow chart showing an operation when data is read out from a memory upon detection of head bearing of a recording sheet.

FIG. 26 is a timing chart showing an operation of the facsimile device of this embodiment.

The facsimile device starts receipt by calling (S91). The device receives data for one page, and stores the received data in an image memory in the controller 4 (S92). The device performs a sheet feeding operation of a recording sheet (S93). The sheet feeding operation is performed from the paper cassette 8 when a side to be recorded is a front side or from the reversal mechanism 14 if it is a back side. The sheet feed operation is continued until a head bearing operation is completed in response to the output from the head bearing sensor 50 (S94). With the operations in steps S93 and S94, image data can be supplied to the recorder unit at the same timing even when a recording operation is performed on either the front or back side of a recording sheet. The image data stored in step S92 is read out from the image memory, and is supplied to the recorder unit in accordance with the head bearing timing. The recorder unit records the image data (S95). When all the data are received (S96), the recording sheet is discharged (S97), and receipt is ended (S98). If the next page is detected in step S96 and the recorded side is a front side (S99), the recording sheet is reversed by the reversal mechanism 14 (S100); if the recorded side is a back side, the recording sheet is discharged (S101). Thereafter, the flow returns to step S92 to receive the next page.

In this manner, in the facsimile device of this embodiment, since image data is sent to the recorder unit on the basis of the detection timing of the head bearing sensor 50, a recording operation can be started at a proper timing although start timings of recording operations for the front and back sides of a recording sheet are different from each other. Thus, a head bearing error for each page can be eliminated.

Note that the number of head bearing sensors 50 is not limited to one. For example, a plurality of sensors may be used in correspondence with the front and back sides.

The facsimile device may be arranged so that image data for the front and back sides are held until a recording sheet is discharged. That is, in a copy mode, image data for both sides of an original read by a reader unit 2 are stored in an image memory in a recorder unit 3 as a pair of image data of two pages, and are held until a copying operation of the corresponding original is completed and a recording sheet is discharged. In a receipt mode, received image data of two pages are paired and stored in the image memory. The image data are held until dual-side recording of the image data of two pages is completed and a recording sheet is discharged. When a paper jam occurs during recording and a re-recording operation must be performed, the image data of two pages stored in the image memory are read out again to start a recording operation on a new recording sheet. Thus, a proper recording operation can be performed without omission of pages.

Figure 27:
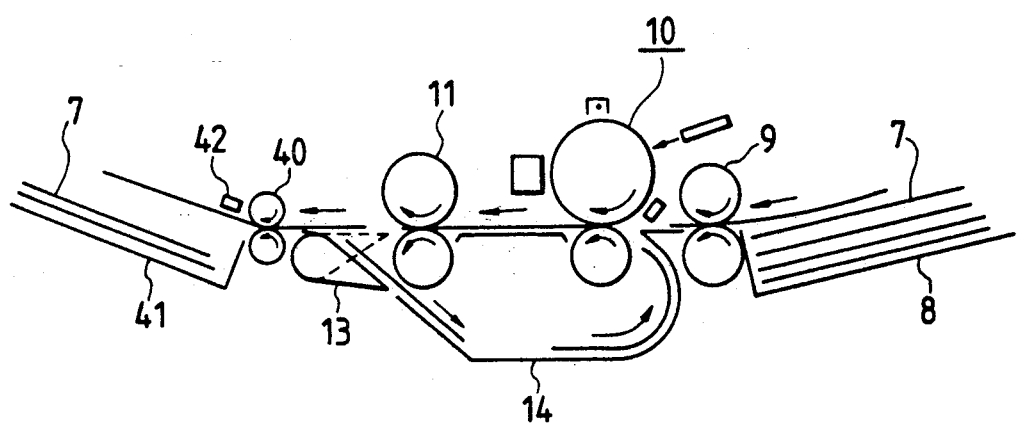
FIG. 27 is a side view showing an arrangement of still another embodiment of a recorder unit.

FIG. 27 shows an arrangement of this embodiment, and the same reference numerals in FIG. 27 denote the same parts as in FIG. 3. A detection sensor 42 detects that a recording sheet is discharged. As will be described later, image data of two pages, i.e., the front and back sides are held until this sensor detects that a recording sheet is discharged.

In the facsimile device for performing dual-side recording, when a receipt operation is normally performed, image data can be in the image memory in units of pages, and can be sequentially recorded on the front and back sides of recording sheets, as shown in FIG. 28(1). As shown in FIG. 28(2), when a paper jam occurs while a recording operation is performed on the front side of a recording sheet, the recording operation can be restarted from data for the front side during the recording operation. Therefore, the image memory need only have a capacity of one page. However, as shown in FIG. 28(3), when a paper jam occurs while a recording operation is performed on the back side of a recording sheet, a recording operation must be restarted from not data for the back side during the recording operation but data for the front side which has already been recorded. Therefore, in this case, received data for the front side must be held until a recording operation of the back side is completed. In the facsimile device of this embodiment, the image memory of two pages is prepared, and even when a paper jam occurs during a recording operation of the back side of a recording sheet, the recording operation can be restarted by processing unique to the receiving side, as will be described later.

Figure 29B:
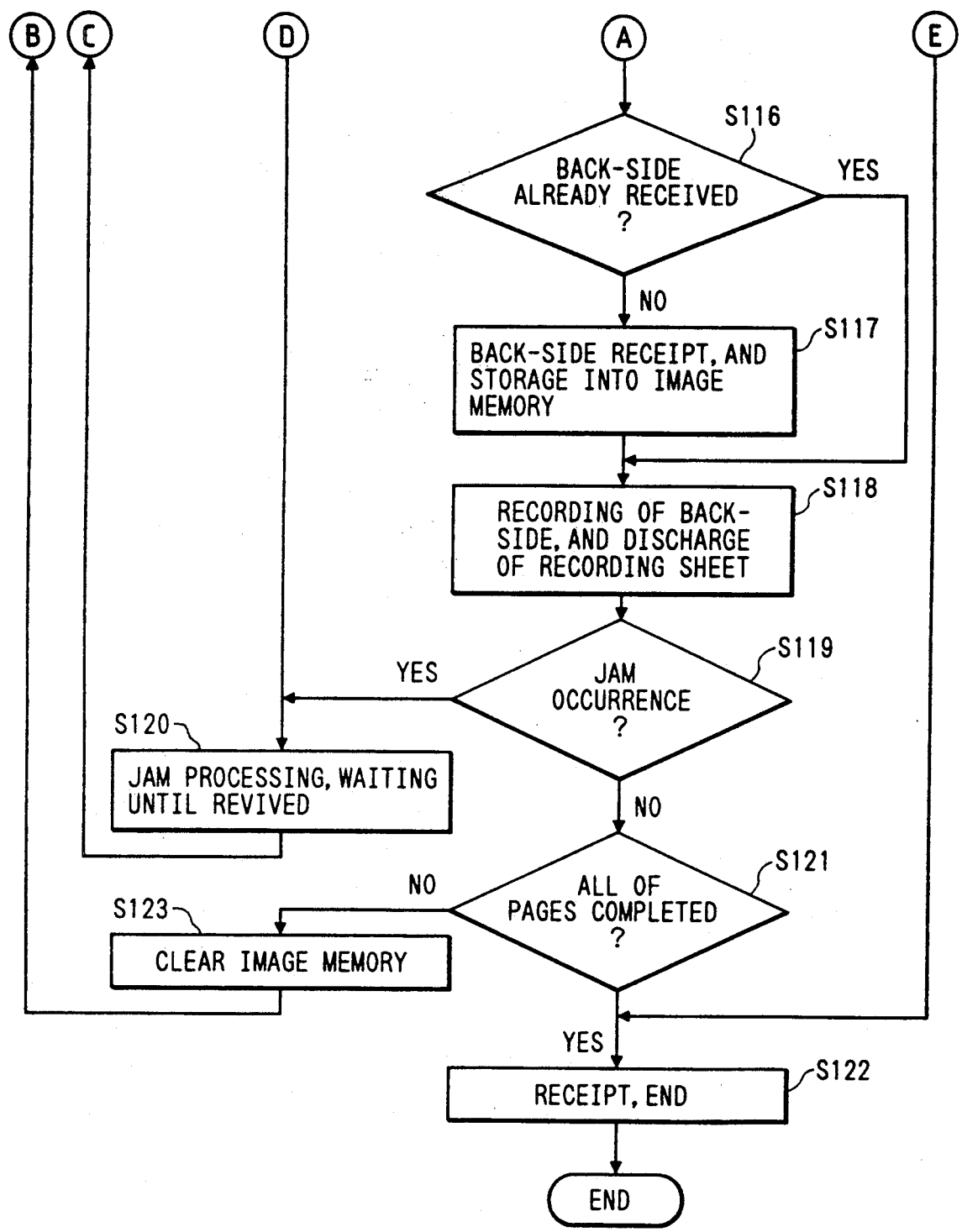
FIG. 29, consisting of FIGS. 29A and 29B, is a flow chart showing an operation when a re-recording operation is performed upon detection of a paper jam during receipt.

FIG. 29 is a flow chart showing an operation of the facsimile device when a re-recording operation is performed.

The facsimile device starts receipt by calling (S111) to receive data of one page as front-side data, and stores the received data in the image memory in the controller 4 (S112). The device records the image data stored in step S112 on the front side of a recording sheet, and then reverses the recording sheet (S113). When a jam occurs in this state (S114), the device waits until jam processing is completed and the operation is revived (S120). Thereafter, the flow returns to step S113.

If no jam occurs in step S113, it is checked if all the pages are received and recorded (S115). If it is determined that receipt and recording of all the pages are completed, the recording sheet is discharged, and receipt is ended (S122). If it is determined in step S115 that receipt and recording of all the pages are not completed yet, it is checked if data for the back side has been received (S116). If NO in step S116, the data for the back side is received and is stored in the image memory (S117). The image data stored in step S117 is recorded on the back side of the recording sheet, and the recording sheet is discharged (S118). If a jam occurs in this state (S119), the device waits until jam processing is completed and the operation is revived (S120). Thereafter, the flow returns to step S113. If no jam occurs, it is checked if all the pages are received and recorded (S121). If it is determined that receipt and recording of all the pages are completed, the recording sheet is discharged, and receipt is ended (S122). If NO in step S121, the image memory is cleared, and the flow returns to step S112.

In this facsimile device, the image memory having a capacity of two pages retains image data of two pages until a recording sheet is discharged. Even if a jam occurs during recording and a re-recording operation is necessary, images of two pages can be easily reproduced by processing unique to the receiving side device, and a proper recording operation can be performed without omission of pages.

In the above embodiments, the dual-side processing function is provided to both the reader unit and the recorder unit. However, a sufficient effect can be expected if the dual-side processing function is provided to only the recorder unit.

In the above embodiments, the laser printer with the reversal mechanism has been exemplified as the recorder unit. However, the recorder unit may be of a thermal transfer type or an ink-jet type as long as data can be recorded on both sides of a recording sheet. Alternatively, a recording operation may be performed from both sides without reversing a recording sheet.

The recorder unit need not be arranged exclusively for the dual-side recording mode. The recorder unit may be arranged as one which can be selectively used in the dual-side recording mode and the single-side recording mode.

What is claimed is:

1. An image recording apparatus comprising:
   receipt means for receiving image data via a communication line;
   recording means for recording the image data received by said receipt means on both sides of a recording medium;
   discriminating means for discriminating as to each page of the received image data whether the page has effective image data or not by counting the number of changed pixels and determining the ineffective pages when the count value is smaller than a predetermined value; and
   control means for controlling said recording means in accordance with a discrimination result of said discriminating means so as to sequentially record the pages having effective image data on both sides of the recording medium without recording the pages having no effective image data.

2. An image processing apparatus comprising:
   transmission means for transmitting image data;
   first discriminating means for discriminating whether or not a receiving side apparatus has a dual-side recording mode; and
   second discriminating means for discriminating, when the receiving side apparatus has the dual-side recording mode, whether or not the receiving side apparatus is set on the dual-side recording mode, wherein said first discriminating means comprises key input means, and discriminates the presence/absence of the dual-side recording mode in accordance with an input signal from said key input means.

3. An apparatus according to claim 2, further comprising setting means for setting the receiving side apparatus in the dual-side recording mode from the transmission side apparatus.

4. An apparatus according to claim 2, further comprising first display means for displaying a discrimination result of said first discriminating means.

5. An apparatus according to claim 2, further comprising second display means for displaying a discrimination result of said second discriminating means.

6. An apparatus according to claim 3, wherein said setting means sets one of the dual-side recording mode and a single-side recording mode, for each page.

7. An image recording apparatus comprising:

receipt means for receiving encoded image data via a communication line;

decoding means for decoding the encoded image data received by said receipt means;

recording means for recording the image data decoded by said decoding means, said recording means capable of being operated in a dual-side mode for recording image data on both sides of a recording medium and in a single-side mode for recording image data on a single side of the recording medium; and selection means for selecting one of the dual-side mode and the single-side mode.

8. An apparatus according to claim 7, wherein said selection means includes changeover means for changing over between the dual-side mode and the single-side mode.

9. An apparatus according to claim 7, further comprising key input means, and wherein said selection means selects one of the dual-side recording mode and a single-side recording mode on the basis of an output of said key input means.

10. An apparatus according to claim 7, wherein said selection means selects one of the dual-side recording mode and a single-side recording mode, for each page.

11. An apparatus according to claim 7, further comprising discharge means for discharging the recording medium on which image data are recorded by said recording means, wherein, in the dual-side mode, the recording medium on which is recorded a last page of all the pages is discharged by said discharge means irrespective of a side on which the last page has been recorded.

12. An apparatus according to claim 11, further comprising discrimination means for discriminating, every time data reception of each page is terminated, whether or not data reception of a next page is performed, wherein, when said discrimination means discriminates that the data reception of a next page is not performed, the page corresponding to the final data reception is discriminated as a last page.

13. An image recording apparatus comprising:

receipt means for receiving encoded image data via a communication line page by page;

decoding means for decoding the encoded image data received by said receipt means;

recording means for recording the image data decoded by said decoding means on both sides of a recording medium by recording sequentially on one side and then the other side of the recording medium;

control means for controlling said recording means to perform image recording on both sides of the recording medium, by recording odd pages on the one side of the recording medium and by recording even pages on the other side, wherein the recording medium for a last page among all pages of received data is discharged irrespective of whether both sides of the recording medium have been recorded; and discrimination means for discriminating, every time the data reception of each page is terminated, whether or not the data reception of a next page is performed, wherein, when said discrimination means discriminates that the data reception of a next page is not performed, the page corresponding to the final data reception is discriminated as a last page.

14. An apparatus according to claim 13, further comprising reading means for reading image data of an original, wherein said recording means records the image data read by said reading means on one or both sides of the recording medium.

15. An apparatus according to claim 13, further comprising reading means for reading image data of an original, and transmission means for transmitting the image data read by said reading means.

16. An image recording apparatus comprising:

receipt means for receiving encoded image data via a communication line;

decoding means for decoding the encoded image data received by said receipt means;

recording means for recording the decoded image data decoded by said decoding means on first and second sides of a recording medium;

discharge means for discharging the recording medium on which image data are recorded on both sides thereof by said recording means; and control means, capable of storing image data of two pages, for retaining image data for the first and second sides until the recording medium is discharged by said discharge means.

17. An apparatus according to claim 16, wherein the recording medium for a last page among all pages of received image data is discharged by said discharge means, irrespective of whether the first and second sides have been recorded.

* * * * *

UNITED STATES PATENT AND TRADEMARK OFFICE
CERTIFICATE OF CORRECTION

PATENT NO. : 5,282,050
DATED : January 25, 1994
INVENTOR(S) : HARUO ISHIZUKA, ET AL.

It is certified that error appears in the above-indentified patent and that said Letters Patent is hereby corrected as shown below:

ON TITLE PAGE

In [56] References Cited, under U.S. PATENT DOCUMENTS:
"4,876,604  8/1989  Nobuta" should read
--4,876,604  10/1989  Nobuta--.

In [56] References Cited, under FOREIGN PATENT DOCUMENTS:
"6231866  8/1985  Japan ." should read
--62-31866  2/1987  Japan .--.

Signed and Sealed this

Second Day of August, 1994

*Attest:*

BRUCE LEHMAN

*Attesting Officer*        Commissioner of Patents and Trademarks